United States Patent
Yamauchi et al.

(10) Patent No.: US 8,460,839 B2
(45) Date of Patent: Jun. 11, 2013

(54) ION-CONDUCTIVE POLYMERIC COMPOSITE MEMBRANE, MEMBRANE-ELECTRODE ASSEMBLY, FUEL CELL, AND PROCESS FOR PRODUCING ION-CONDUCTIVE POLYMERIC COMPOSITE MEMBRANE

(75) Inventors: Kazuhiro Yamauchi, Suntou-gun (JP); Kenji Yamada, Yokohama (JP); Mamiko Kumagai, Yokohama (JP); Kyoko Kumagai, Mishima (JP); Norishige Kakegawa, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 261 days.

(21) Appl. No.: 12/992,648

(22) PCT Filed: Jun. 18, 2009

(86) PCT No.: PCT/JP2009/061557
§ 371 (c)(1),
(2), (4) Date: Nov. 15, 2010

(87) PCT Pub. No.: WO2009/154306
PCT Pub. Date: Dec. 23, 2009

(65) Prior Publication Data
US 2011/0070522 A1  Mar. 24, 2011

(30) Foreign Application Priority Data
Jun. 20, 2008  (JP) ................ 2008-162558

(51) Int. Cl.
*H01M 8/10* (2006.01)
(52) U.S. Cl.
USPC ........................... 429/491; 429/492

(58) Field of Classification Search
USPC .................................................. 429/491, 492
See application file for complete search history.

(56) References Cited

U.S. PATENT DOCUMENTS

| | | | |
|---|---|---|---|
| 5,512,644 A * | 4/1996 | Ogura et al. ................... | 526/258 |
| 6,958,198 B2 * | 10/2005 | Iwamoto et al. .............. | 429/122 |
| 7,396,880 B2 * | 7/2008 | Goldbach et al. ............. | 525/199 |
| 7,670,720 B1 * | 3/2010 | Buerger et al. ............... | 429/188 |
| 2004/0081823 A1 | 4/2004 | Arai | |
| 2004/0180251 A1 | 9/2004 | Arai | |
| 2005/0084728 A1 | 4/2005 | Kim et al. | |
| 2006/0269816 A1 | 11/2006 | Kim et al. | |
| 2008/0176126 A1 | 7/2008 | Choi et al. | |
| 2010/0275979 A1 | 11/2010 | Maruyama | |

FOREIGN PATENT DOCUMENTS

| | | |
|---|---|---|
| JP | 2004-146164 A | 5/2004 |
| JP | 2004-281178 A | 10/2004 |
| JP | 2005-079099 A | 3/2005 |
| JP | 2006-327932 A | 12/2006 |

(Continued)

*Primary Examiner* — Stephen J. Kalafut
(74) *Attorney, Agent, or Firm* — Fitzpatrick, Cella, Harper & Scinto (57) ABSTRACT

An ion-conductive polymer composite membrane is provided which has both high gas barrier properties and high protonic conductivity. The ion-conductive polymer composite membrane includes an ion-conductive polymer and ion-conductive materials. The ion-conductive materials each include i) an inorganic layered structure including a plurality of layers formed of an inorganic compound and ii) a sulfobetaine-type or hydroxysulfobetaine-type ampholytic surfactant. The ampholytic surfactant is present between the layers formed of an inorganic compound. The present invention further provides a membrane-electrode assembly and a fuel cell which use the ion-conductive polymer composite membrane, and a process for producing the ion-conductive polymer composite membrane.

5 Claims, 3 Drawing Sheets

FOREIGN PATENT DOCUMENTS

| | | |
|---|---|---|
| JP | 2008-065987 A | 3/2008 |
| JP | 2008-071749 A | 3/2008 |
| JP | 2008-078137 A | 4/2008 |
| WO | 2008/020643 A1 | 2/2008 |

* cited by examiner

ION-CONDUCTIVE POLYMERIC COMPOSITE MEMBRANE, MEMBRANE-ELECTRODE ASSEMBLY, FUEL CELL, AND PROCESS FOR PRODUCING ION-CONDUCTIVE POLYMERIC COMPOSITE MEMBRANE

TECHNICAL FIELD

This invention relates to an ion-conductive polymer composite membrane, a membrane-electrode assembly, a fuel cell and a process for producing an ion-conductive polymer composite membrane.

BACKGROUND ART

As a method for improving gas barrier properties of ion-conductive polymeric membranes including a NAFION (registered trademark; available from Du Pont Co.) membrane, Japanese Patent Laid-Open Application No. 2006-327932 discloses a technique in which ion-conductive materials obtained by utilizing silanol groups of inorganic layered structures to bind sulfonic acid groups to the inorganic layered structures are dispersed in an ion-conductive polymeric membrane.

Figure 1:
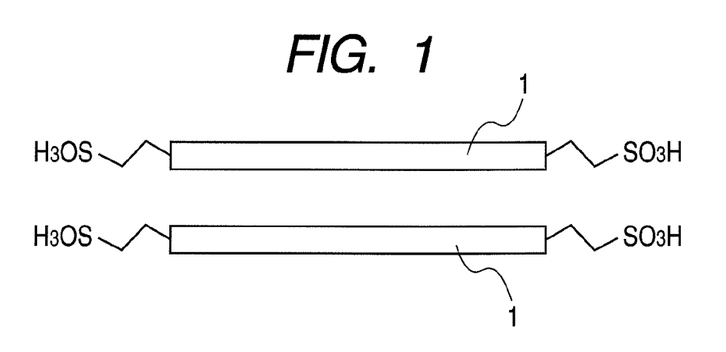
FIG. 1 is a diagrammatic view showing a prior art ion-conductive material.

However, in Japanese Patent Laid-Open Application No. 2006-327932, montmorillonite, which has silanol groups only on the end faces, is used as an inorganic layered compound, and hence, as shown in FIG. 1, the sulfonic acid groups are bound with only the end faces of layers 1 formed of the inorganic layered compound. Thus, the ion-conductive polymer composite membrane obtained has insufficient proton conductivity.

DISCLOSURE OF THE INVENTION

Accordingly, an object of the present invention is to provide an ion-conductive polymer composite membrane having both high gas barrier properties and high proton conductivity, a membrane-electrode assembly and a fuel cell which use the ion-conductive polymer composite membrane, ion-conductive materials for forming the ion-conductive polymer composite membrane, a process for producing the ion-conductive materials and a process for producing the ion-conductive polymer composite membrane.

The first of the present invention is related to an ion-conductive polymer composite membrane including an ion-conductive polymer and ion-conductive materials, wherein the ion-conductive materials each include i) an inorganic layered structure including a plurality of layers formed of an inorganic compound and ii) a sulfobetaine-type or hydroxysulfobetaine-type ampholytic surfactant; and the ampholytic surfactant is present between the layers formed of an inorganic compound.

The second of the present invention is a membrane-electrode assembly including the above ion-conductive polymer composite membrane and two catalyst layers provided in contact with the ion-conductive polymer composite membrane.

The third of the present invention is a fuel cell which includes the above membrane-electrode assembly, two gas diffusion layers provided in contact with the membrane-electrode assembly, and two collectors provided respectively in contact with the two gas diffusion layers.

The fourth of the present invention is a process for producing an ion-conductive polymer composite membrane, which includes:

replacing metal ions of metal ion-containing inorganic layered structures with an ampholytic surfactant having an ion exchange group, to form ion-conductive materials, where the metal ion-containing inorganic layered structures each include i) an inorganic layered structure including a plurality of layers formed of an inorganic compound and ii) metal ions present between the layers formed of an inorganic compound; and dispersing the ion-conductive materials in an ion-conductive polymer membrane.

The present invention can provide an ion-conductive polymer composite membrane having both high gas barrier properties and high proton conductivity, a membrane-electrode assembly and a fuel cell which use the ion-conductive polymer composite membrane, and a process for producing the ion-conductive polymer composite membrane.

Further features of the present invention will become apparent from the following description of exemplary embodiments with reference to the attached drawings.

BEST MODE FOR CARRYING OUT THE INVENTION

The present invention is described below in detail.

The first of the present invention is an ion-conductive polymer composite membrane which includes an ion-conductive polymer and ion-conductive materials, wherein the ion-conductive materials each include i) an inorganic layered structure including a plurality of layers formed of an inorganic compound and ii) a sulfobetaine-type or hydroxysulfobetaine-type ampholytic surfactant, and the ampholytic surfactant is present between the layers formed of an inorganic compound.

Figure 2:
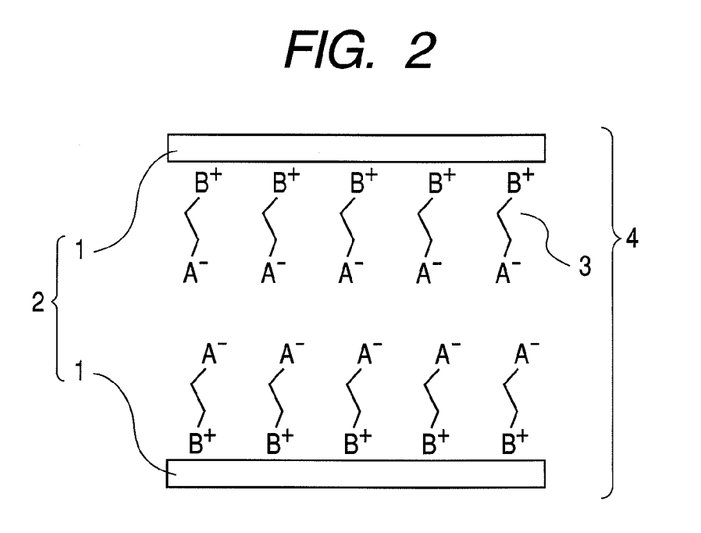
FIG. 2 is a diagrammatic view showing an example of an ion-conductive material in the ion-conductive polymer composite membrane of the present invention.

FIG. 2 is a diagrammatic view showing an example of the ion-conductive material in the ion-conductive polymer composite membrane of the first of the present invention.

In FIG. 2, reference numeral 1 denotes layers formed of an inorganic compound; and 2, an inorganic layered structure made up of two or more layers 1 formed of an inorganic compound. Then, an ion-conductive material 4 in the ion-conductive polymer composite membrane of the first of the present invention is constituted of the inorganic layered structure 2 and an ampholytic surfactant (in other words, ampholytic amphiphilic molecules) 3 having ion exchange groups A, which is present between the layers 1 formed of an inorganic compound constituting the inorganic layered structure 2.

Components constituting the ion-conductive material are described below.

The inorganic layered structure 2 is an aggregate of the layers 1 formed of an inorganic compound. Herein, the inorganic compound refers to a compound containing no carbon, an allotrope of carbon such as graphite or diamond, carbon monoxide, carbon dioxide, a metal carbonate such as calcium carbonate, hydrocyanic acid or a metal cyanide, a metal cyanate, or a metal thiocyanate.

In the present invention, the "layer" has an aspect ratio of 20 or more. Also, the aspect ratio of a structure a is defined as (length of a line segment (A) having a maximum length among line segments that can be present in the structure a)/(length of a line segment (B) having a maximum length among line segments that can be present in the structure a at right angles to the line segment (A)). The length of the line segment (a) and the length of the line segment (B) can be found by measuring a layer formed of a peeled inorganic layered compound by means of a transmission electron microscope (TEM) or an atomic force microscope (AFM). The length of the line segment (A) can be inferred from the chemical structure of an inorganic layered compound.

Figure 3:
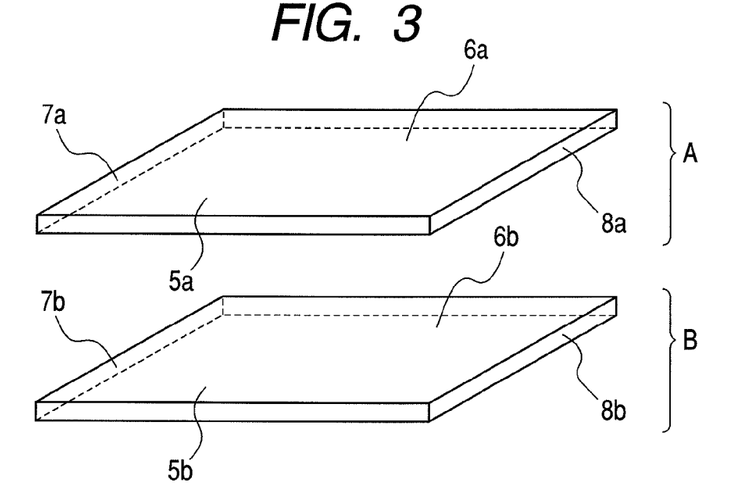
FIG. 3 is a diagrammatic view showing an example of layers formed of an inorganic compound in the present invention.

The inorganic layered structure commonly has a structure in which layers negatively charged formed of an inorganic compound are stacked at certain intervals when deficiency of electric charges is supplemented with cations present between the layers. The layers formed of an inorganic compound face each other on their principal surfaces. Specifically, where the layers formed of an inorganic compound are rectangular as shown in FIG. 3, a layer A formed of an inorganic compound, having principal surfaces 5a and 6a and edge faces 7a and 8a, and a layer B formed of an inorganic compound, having principal surfaces 5b and 6b and edge faces 7b and 8b, face each other on their principal surfaces 6a and 5b.

Examples of such an inorganic layered structure include silicate minerals, phosphate minerals, titanate minerals, manganate minerals and niobate minerals which have a layered structure. Of these, silicate minerals having layered structure are preferred. The silicate minerals having a layered structure include as specific examples a mica group (muscovite, biotite, annite, phlogopite, shirozulite, paragonite, siderophyllite, eastonite, polylithionite, trilithionite, lepidolite, zinnwaldite, margarite, illite, glauconite), a smectite group (montmorillonite, beidellite, nontronite, saponite, hectorite, stevensite, talc), a kaolin group (kaolinite, halloysite), vermiculite, magadiite, kanemite, and kenyaite. Those of the smectite group are particularly preferred. These phyllosilicate minerals may be natural ones and synthetic ones, which are useful.

The ampholytic surfactant 3 is a surfactant having i) anionic groups that are ion exchange groups A and ii) cationic groups B, and is present between the layers 1 formed of an inorganic compound in the inorganic layered structure 2. Inasmuch as the ampholytic surfactant 3 is present between the layers of the inorganic layered structure, the ion exchange groups A are disposed between the layers of the inorganic layered structure. Additionally, all the ampholytic surfactants 3 need not necessarily be of the same type, and ampholytic surfactants of different types may be present between the layers of the inorganic layered structure.

The ion exchange groups A are functional groups capable of bringing about ionic dissociation, and include sulfonic acids, carboxylic acids, phosphoric acids, phosphoric acid and phosphonous acid.

The ampholytic surfactant having such ion exchange groups A includes as examples ampholytic surfactants of a carboxybetaine type, a phosphobetaine type, a sulfobetaine type and a hydroxysulfobetaine type. Then, of these, an ampholytic surfactant of a sulfobetaine type or hydroxysulfobetaine type is preferred. The hydroxysulfobetaine type ampholytic surfactant includes alkyl hydroxysulfobetaines, alkyl dimethylamino hydroxysulfobetaines, fatty acid amide propyl hydroxysulfobetaines, and derivatives thereof. The sulfobetaine type ampholytic surfactant includes alkyl sulfobetaines, alkyl dimethylamino sulfobetaines, fatty acid amide propyl sulfobetaines, and derivatives thereof.

The ion-conductive polymer membrane is formed of a polymeric compound having ion exchange groups, and can hold the ion-conductive materials. The ion-conductive materials are preferably dispersed in an ion-conductive polymer membrane to form the ion-conductive polymer composite membrane.

Such an ion-conductive polymer includes a perfluorosulfonic acid polymer such as NAFION (registered trademark), polyamide, polyamide-imide, polyimide, polyether ketone, polyether ether ketone, polyphenylene, polyphenylene ether, polyester, polycarbonate, polyethylene, polypropylene, polyester, polystyrene, polyacetal, polysulfone and poly(meth) acrylic acid derivatives, which all have ion exchange groups; and a block copolymer composed of ion-conductive blocks and ion-nonconductive blocks, all of which may be used.

The ion-conductive materials used in the present invention swell upon absorbing water molecules between the layers, and hence, when an electrolyte membrane containing the ion-conductive materials in a large quantity is used for a fuel cell, the output may be lowered. Accordingly, the ion-conductive materials are in a content of 50% by mass or less, preferably 30% by mass or less, and more preferably 10% by mass or less, based on the mass of the ion-conductive polymer composite membrane.

As the ion-conductive materials contained in the ion-conductive polymer composite membrane, ion-conductive materials of one type or plural types may be used.

The second of the present invention is a membrane-electrode assembly which includes the ion-conductive polymer composite membrane according to the first of the present invention and two catalyst layers in contact with the ion-conductive polymer composite membrane.

Figure 4:
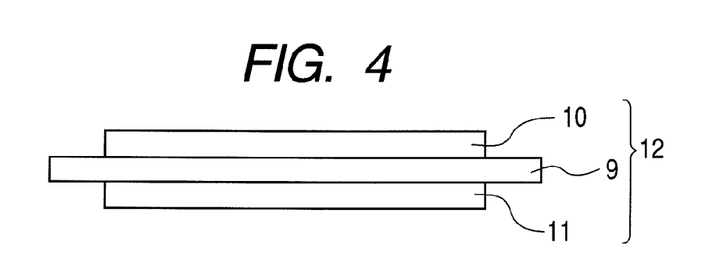
FIG. 4 is a diagrammatic view showing an example of a membrane-electrode assembly of the present invention.

An example of the membrane-electrode assembly according to the second of the present invention is shown in FIG. 4.

A membrane-electrode assembly 12 according to the second of the present invention is constituted of an ion-conductive polymer composite membrane 9 and two catalyst layers 10 and 11 provided in contact with the ion-conductive polymer composite membrane.

The two catalyst layers 10 and 11 (an anode-side catalyst layer 10 and a cathode-side catalyst layer 11) may each be composed of a structure formed of a catalyst such as a catalyst of a metal such as platinum or a catalyst of an alloy of platinum and a metal other than platinum such as ruthenium, or a layer formed by dispersing and supporting such a structure on a support such as carbon. The structures usable for the catalyst layers may have a particulate shape or shapes other than the particulate shape, such as a dendritic form.

When the membrane-electrode assembly according to the second of the present invention is formed, it is preferable that the ion-conductive polymer composite membrane 9 is held between the catalyst layer 10 and the catalyst layer 11 and subjected to hot pressing at a temperature of from 130° C. to 150° C. for a pressing time of from 1 minute to 30 minutes at a pressure of from 1 MPa to 40 MPa.

Next, the third of the present invention is described.

The third of the present invention is a fuel cell which includes the membrane-electrode assembly according to the second of the present invention, two gas diffusion layers each coming in contact with the membrane-electrode assembly, and two collectors provided respectively in contact with the two gas diffusion layers.

Figure 5:
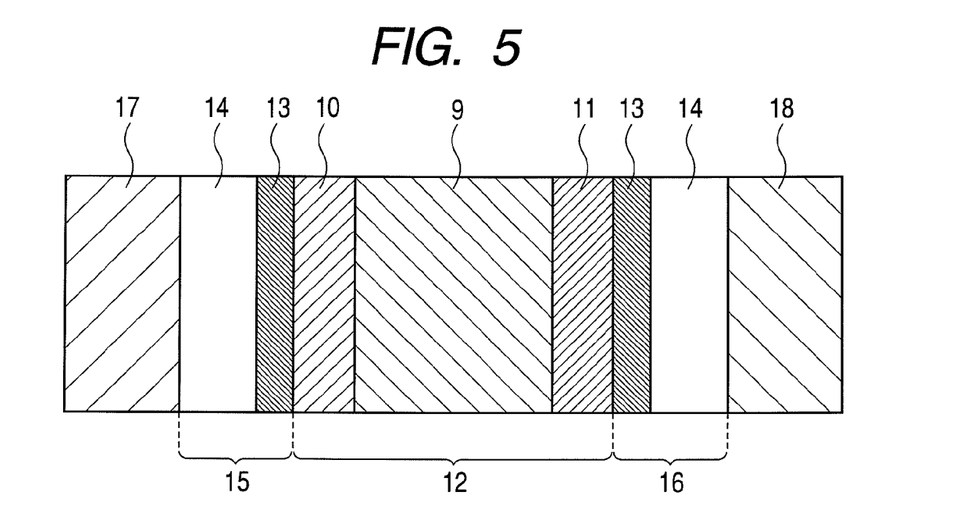
FIG. 5 is a diagrammatic view showing an example of a fuel cell of the present invention.

FIG. 5 is a sectional view showing an example of the fuel cell according to the third of the present invention, in which reference numeral 12 denotes the membrane-electrode assembly according to the second of the present invention; 15, an anode-side gas diffusion layer; 16, a cathode-side gas diffusion layer; 17, an anode-side collector; and 18, a cathode-side collector.

The anode-side gas diffusion layer 15 and the cathode-side gas diffusion layer 16 have the function of feeding oxygen or a fuel to the membrane-electrode assembly 12. The anode-side gas diffusion layer 15 and the cathode-side gas diffusion layer 16 may each preferably be made up of a plurality of sub-layers. In the case where it is made up of a plurality of sub-layers, it is preferable that, among the sub-layers included in each of the anode-side gas diffusion layer 15 and cathode-side gas diffusion layer 16, the sub-layers coming in contact with the membrane-electrode assembly 12 have pores smaller in average diameter than the other sub-layers. Specifically, where the cathode-side gas diffusion layers are each made up of two sub-layers, it is preferable that, as shown in FIG. 5, among the sub-layers included in each of the anode-side gas diffusion layer 15 and cathode-side gas diffusion layer 16 each have, the sub-layers 13 coming in contact with the membrane-electrode assembly 12 have pores smaller in average diameter than the other sub-layers 14.

In the case where the sub-layers 13 coming in contact with the membrane-electrode assembly 12 among the sub-layers of the anode-side gas diffusion layer 15 and cathode-side gas diffusion layer 16 have pores smaller in average diameter than the other sub-layers, the sub-layer coming in contact with the membrane-electrode assembly 12 is hereinafter called a micro-porous layer (MPL) in some cases.

The MPL can be made up of, e.g., carbon fine particles by using PTFE as a binder. Examples of such carbon fine particles include acetylene black, KETJEN BLACK, fibrous carbon formed by vapor-phase growth, and carbon nanotube.

Carbon cloth, carbon paper, porous metal, etc. may be used at the part other than the MPL among the sub-layers constituting the anode-side gas diffusion layer 15 and cathode-side gas diffusion layer 16. Further, a gas diffusion layer having a configuration composed of three sub-layers may be used, which may be formed by stacking the MPL and two or more of carbon cloth, carbon paper, porous metal, etc., or superimposing on the MPL two or more times one of carbon cloth, carbon paper, porous metal, etc. When a metal material is used for the gas diffusion layer, it is preferable to use a material excellent in oxidation resistance. Specifically, SUS316L, nickel chromium alloy and titanium may be used. As the porous metal of the nickel-chromium alloy, CELLMET (registered trademark), available from Sumitomo Electric Toyama Co., Ltd., may be used.

As the materials for the anode-side collector 17 and cathode-side collector 18, materials excellent in good conductivity and oxidation resistance are used. Examples of such materials include platinum, titanium, stainless steel (SUS), SUS coated with gold, SUS coated with carbon, aluminum coated with gold, and aluminum coated with carbon.

The fourth of the present invention is directed to a process for producing an ion-conductive polymer composite membrane, which includes:

(i) replacing metal ions of metal ion-containing inorganic layered structures with an ampholytic surfactant having an ion exchange group to form ion-conductive materials, where the metal ion-containing inorganic layered structures each include i) an inorganic layered structure including a plurality of layers formed of an inorganic compound and ii) metal ions present between the layers formed of an inorganic compound; and (ii) dispersing the ion-conductive materials in an ion-conductive polymer membrane.

Figure 6A:
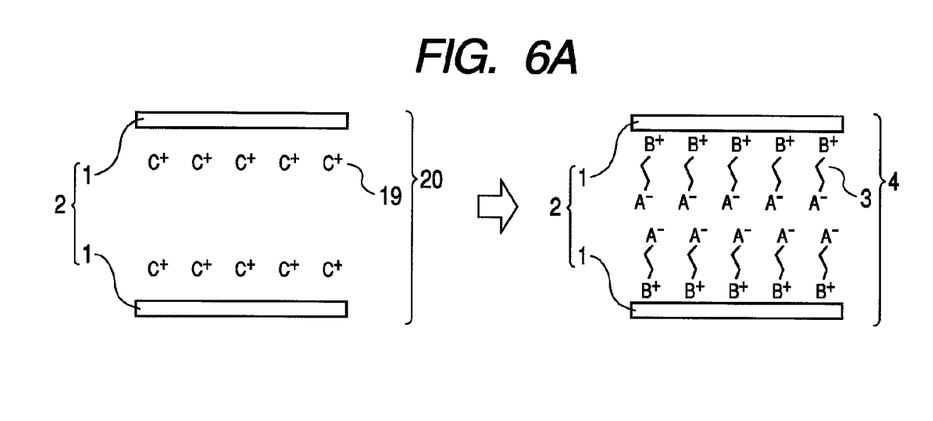
FIGS. 6A and 6B are diagrammatic flow charts showing examples of a process for producing an ion-conductive material in the present invention.
Figure 6B:
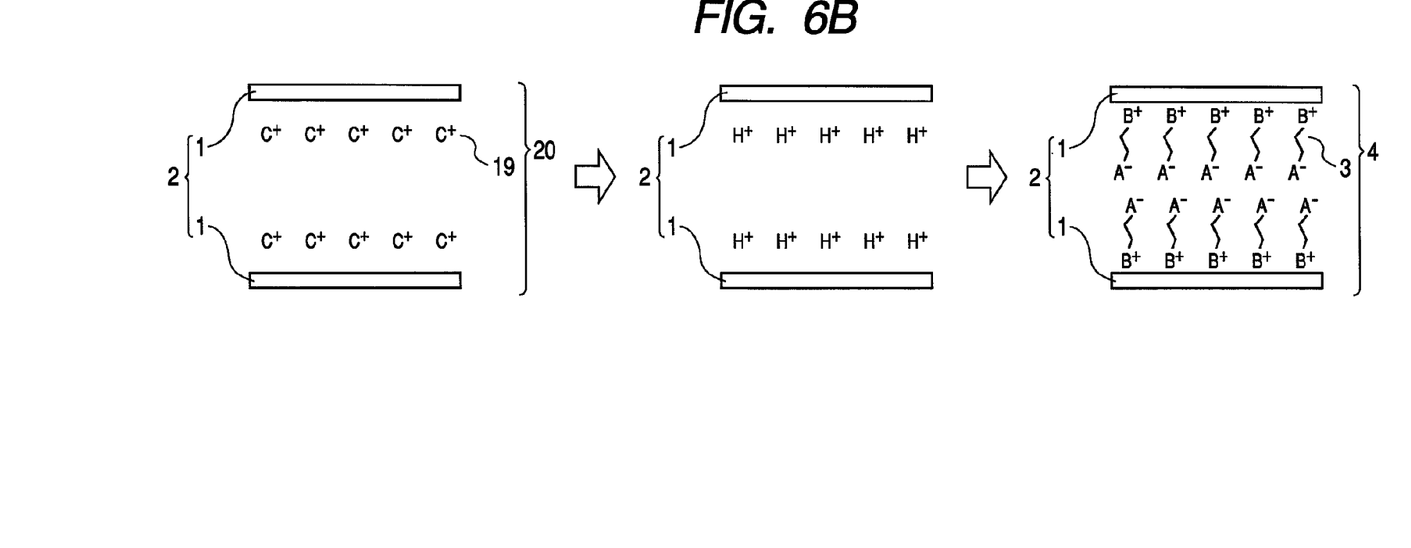

FIGS. 6A and 6B are each a diagrammatic flow chart illustrating an example of the step (i) of the process in the fourth of the present invention.

In FIG. 6A, a metal ion-containing inorganic layered structure 20 is constituted of an inorganic layered structure 2 having a plurality of layers 1 formed of an inorganic compound and metal ions 19 present between the layers 1 formed of an inorganic compound (the left side in FIG. 6A).

The inorganic layered structure 2 is the same as the inorganic layered structure in the first of the present invention.

The metal ions 19 are present between the layers 1 formed of an inorganic compound. Such metal ions include sodium ions, potassium ions, calcium ions, magnesium ions, iron ions, nickel ions, copper ions and lithium ions.

The metal ions 19 present between the layers 1 formed of an inorganic compound are replaced with cationic groups B of an ampholytic surfactant 3 having ion exchange groups A and cationic groups B, so that the cationic groups B and the layers 1 formed of an inorganic compound are bound by ionic bonds (the right side in FIG. 6A).

As a specific method by which the metal ions 19 are replaced with the ampholytic surfactant 3, a method may be used in which, e.g., the metal-ion-containing inorganic layered structures 20 are dispersed in a solution containing the ampholytic surfactant 3 and stirred. After the metal ions have been replaced with the ampholytic surfactant, the product may be filtered or centrifuged to produce the ion-conductive materials.

When the metal ions 19 are replaced with the ampholytic surfactant 3, it is also preferable that, as shown in FIG. 6B, after the step of replacing the metal ions 19 with protons (from the left side to the middle in FIG. 6B), a step is taken in which the protons are replaced with the ampholytic surfactant 3 (from the middle to the right side in FIG. 6B). In such a case, a method may be used in which the metal ion-containing inorganic layered structures are dispersed in a solution containing the protons and stirred, followed by collection and purification, and thereafter, the purified product is dispersed in a solution containing the ampholytic surfactant 3 and stirred.

That the metal ions present between the layers of the inorganic layered structure have been replaced with the ampholytic surfactant may be confirmed by elementary analysis such as inductively coupled plasma mass spectroscopy (ICP-MS), X-ray photoelectron spectroscopy (XPS, or electron spectroscopy for chemical analysis ESCA), or secondary ion mass spectroscopy (SIMS). The amount of metal ions remaining in the inorganic layered structure can be determined quantitatively by such a method, whereby the degree of substitution with the ampholytic surfactant can be calculated. Also, where the metal ions present between the layers of the inorganic layered structure have been replaced with the ampholytic surfactant, the interlayer distance of the inorganic layered structure is changed, and hence, can be measured by X-ray diffractometry (XRD) to ascertain the degree of substitution.

The step (ii) of the process in the fourth of the present invention is described below.

As a method by which the ion-conductive materials obtained in the step (i) are dispersed in the ion-conductive polymer membrane, such methods as shown below may be used.

As a first method, a method is available in which a solution (a) is prepared by dispersing the ion-conductive materials obtained in the step (i) in a solution of a monomer capable of making the ion-conductive polymer membrane, and after the monomer in the solution (a) has been polymerized, the resultant is applied to the surface of a substrate to form a membrane.

There is no particular limitation on the polymerization reaction as long as the polymerization reaction is not terminated by the ion exchange groups of the inorganic layered structures. For example, radical polymerization is preferable in which the polymerization reaction may proceed without being influenced by the ion exchange groups. As a radical polymerization initiator, a peroxide type polymerization initiator such as benzoyl peroxide or an azo type polymerization initiator such as azobisisobutyronitrile may be used. A solvent for the solution (a) may be one capable of dispersing the inorganic layered structures and the monomer, as exemplified by N-dimethylformamide (DMF), N-methyl-2-pyrrolidone (NMP), dimethyl sulfoxide (DMSO), γ-butyrolactone, tetrahydrofuran, 1,4-dioxane, dichloromethane, chloroform, 1,2-dichloroethane, chlorobenzene, dichlorobenzene, ethylene glycol monomethyl ether, ethylene glycol monoethyl ether, propylene glycol monomethyl ether, propylene glycol monoethyl ether, methanol, ethanol, and propanol. Besides, a mixed solvent may be used which is obtained by mixing two or more of the above solvents.

The solution (a) in which the polymerization reaction has been completed may be applied directly to the surface of a substrate. Alternatively, after the solution (a) has been purified and collected, a solution obtained by re-dispersing the solution (a) in a solvent may be applied to the surface of a substrate. As a method for applying the solution to the surface of a substrate, the following may be used: a bar coating method, a gravure coating method, a spin coating method, a dip coating method, a roll coating method, a spray coating method, a casting method, etc.

As a second method, a method is available in which the ion-conductive polymer and ion-conductive materials which are to constitute the ion-conductive polymer composite membrane are mechanically kneaded at a temperature not lower than the glass transition temperature of the ion-conductive polymer, and the product thus obtained is applied to the surface of a substrate to form a membrane.

As a third method, a method is available in which a solution (b) is prepared by dispersing the ion-conductive materials in a solution including the ion-conductive polymer, and the solution (b) is applied to the surface of a substrate to form a membrane.

As a method for applying the solution (b) to the surface of a substrate, the following may be used: a bar coating method, a gravure coating method, a spin coating method, a dip coating method, a roll coating method, a spray coating method, a casting method, etc.

As a solvent for the solution (b), a solvent may be used which is the same as the solvent for the solution including a monomer to be formed into the ion-conductive polymer membrane in the first method.

When the ion-conductive materials are dispersed in the solution including the ion-conductive polymer, an ultrasonic washing machine or a homogenizer may be used. The use of any one of these enables the dispersion of the ion-conductive materials in the solution (b) to be improved. Also, the dispersion state of the ion-conductive materials in the ion-conductive polymer composite membrane can be confirmed easily by observation of an ultrathin slice of the membrane with a transmission electron microscope (TEM).

EXAMPLES

Synthesis Example 1

Production of H-Montmorillonite

As a clay mineral composed chiefly of hydrated aluminum silicate, 5 g of montmorillonite produced in Tsukinuno, Yamagata Prefecture was stirred and dispersed in 500 ml of 1N hydrochloric acid for 24 hours to effect reaction. After the reaction, the product was centrifuged at 10,000 rpm for 15 minutes, and the supernatant liquid was removed, and the resultant was dispersed again in water. Reprecipitation by centrifugation and washing with water were repeated twice, to thereby produce H-montmorillonite in which sodium ions present between layers of montmorillonite had been replaced with protons.

Synthesis Example 2

Production of Sulfobetaine-Containing Montmorillonite 10 g of H-montmorillonite obtained in Synthesis Example 1 and 2.9 g of dimethyl ethyl ammonium propane sulfobetaine were stirred in 500 ml of water for 24 hours to effect reaction. After the reaction, the product was centrifuged at 10,000 rpm for 15 minutes, and the supernatant liquid was removed, followed by dispersion in methanol. Reprecipitation by centrifugation and washing with water were repeated twice to produce sulfobetaine-containing montmorillonite in which the protons present between layers of montmorillonite had been replaced with dimethyl ethyl ammonium propane sulfobetaine.

Synthesis Example 3

Production of Hydroxysulfobetaine-Containing Montmorillonite 10 g of H-montmorillonite obtained in Synthesis Example 1 and 5.8 g of lauric acid amide propyl hydroxysulfobetaine were stirred in 500 ml of water for 24 hours to effect reaction. After the reaction, the product was centrifuged at 10,000 rpm for 15 minutes, and the supernatant liquid was removed, followed by dispersion in methanol. Reprecipitation by centrifugation and washing with water were repeated twice to produce hydroxysulfobetaine-containing montmorillonite in which the protons present between layers of montmorillonite had been replaced with lauric acid amide propyl hydroxysulfobetaine.

Synthesis Example 4

Production of Sulfonated Montmorillonite

To a mixed solution of 1.8 ml of water, 100 µl of 35% hydrochloric acid and 10 ml of ethanol, 2 ml of mercaptopropyltrimethoxysilane was slowly dropwise added, and the resultant was stirred at 50° C. for 1 hour. The solution thus obtained was mixed with a solution prepared by dispersing 10 g of montmorillonite produced in Tsukinuno, Yamagata Prefecture in 60 ml of ethanol, and was stirred at 70° C. for 13 hours. Then, 10 g of the montmorillonite thus synthesized having mercapto groups was stirred in a mixed solution of 40 ml of ethanol and 10 ml of hydrogen peroxide at 70° C. for 2 hours, thereby replacing the mercapto groups with sulfonic acid groups to produce sulfonated montmorillonite.

Example 1

NAFION/Sulfobetaine-Containing Montmorillonite Composite Membrane

A 5 wt % NAFION solution was prepared. Subsequently, the sulfobetaine-containing montmorillonite obtained in Synthesis Example 2 was dispersed in the NAFION solution to prepare a mixed liquid of NAFION and the sulfobetaine-containing montmorillonite which were in a weight ratio of 90:10. Thereafter, the sulfobetaine-containing montmorillonite was further thoroughly dispersed in the mixed liquid by means of an ultrasonic washing machine, and the resulting mixed liquid was formed into a membrane by a solvent casting method in a nitrogen atmosphere. The thickness of the membrane thus obtained was 40 μm.

Alternating current impedance measurement (voltage amplitude: 5 mV; frequency: 1 Hz to 1 MHz) was made by a four-terminal method. The electrical conductivity of the resultant electrolyte membrane in the membrane surface direction was calculated from the resistance value found. As a result, the ionic conductivity at a temperature of 50° C. and a relative humidity of 50% was found to be $2.32 \times 10^{-2}$ S·cm$^{-1}$.

Example 2

NAFION/Hydroxysulfobetaine-Containing Montmorillonite Composite Membrane

A 5 wt % NAFION solution was prepared. Subsequently, the hydroxysulfobetaine-containing montmorillonite obtained in Synthesis Example 3 was dispersed in the NAFION solution to prepare a mixed liquid of NAFION and the hydroxysulfobetaine-containing montmorillonite which were in a weight ratio of 90:10. Thereafter, the hydroxysulfobetaine-containing montmorillonite was further thoroughly dispersed in the mixed liquid by means of an ultrasonic washing machine, and the resulting mixed liquid was formed into a membrane by a solvent casting method in a nitrogen atmosphere. The thickness of the membrane thus obtained was 40 μm.

Alternating current impedance measurement (voltage amplitude: 5 mV; frequency: 1 Hz to 1 MHz) was made by a four-terminal method. The electrical conductivity of the resultant electrolyte membrane in the membrane surface direction was calculated from the resistance value found. As a result, the ionic conductivity at a temperature of 50° C. and a relative humidity of 50% was found to be $1.68 \times 10^{-2}$ S·cm$^{-1}$.

Comparative Example 1

NAFION/H-Montmorillonite Composite Membrane

A 5 wt % NAFION solution was prepared. Subsequently, the H-montmorillonite obtained in Synthesis Example 1 was dispersed in the NAFION solution to prepare a mixed liquid of NAFION and the H-montmorillonite which were in a weight ratio of 90:10. Thereafter, the H-montmorillonite was further thoroughly dispersed in the mixed liquid by means of an ultrasonic washing machine, and the resulting mixed liquid was formed into a membrane by a solvent casting method in a nitrogen atmosphere. The thickness of the membrane thus obtained was 40 μm in layer thickness.

Alternating current impedance measurement (voltage amplitude: 5 mV; frequency: 1 Hz to 1 MHz) was made by a four-terminal method. The electrical conductivity of the resultant electrolyte membrane in the membrane surface direction was calculated from the resistance value found. As a result, the ionic conductivity at a temperature of 50° C. and a relative humidity of 50% was found to be $2.55 \times 10^{-3}$ S·cm$^{-1}$.

Comparative Example 2

NAFION/Sulfonated Montmorillonite Composite Membrane

A 5 wt % NAFION solution was prepared. Subsequently, the sulfonated montmorillonite obtained in Synthesis Example 4 was dispersed in the NAFION solution to prepare a mixed liquid of NAFION and the sulfonated montmorillonite which were in a weight ratio of 90:10. Thereafter, the sulfonated montmorillonite was further thoroughly dispersed in the mixed liquid by means of an ultrasonic washing machine, and the resulting mixed liquid was formed into a membrane by a solvent casting method in a nitrogen atmosphere. The thickness of the membrane thus obtained was 40 μm.

Alternating current impedance measurement (voltage amplitude: 5 mV; frequency: 1 Hz to 1 MHz) was made by a four-terminal method. The electrical conductivity of the resultant electrolyte membrane in the membrane surface direction was calculated from the resistance value found. As a result, the ionic conductivity at a temperature of 50° C. and a relative humidity of 50% was found to be $5.69 \times 10^{-3}$ S·cm$^{-1}$.

The results of Examples 1 and 2 and Comparative Examples 1 and 2 are shown in Table 1 below.

TABLE 1

|  | Ion-conductive polymer | Ion-conductive materials | Content of ion-conductive materials (%) | Ionic conductivity (S · cm$^{-1}$) |
|---|---|---|---|---|
| Example 1 | NAFION | Sulfobetaine-containing montmorillonite | 10 | $2.32 \times 10^{-2}$ |
| Example 2 | NAFION | Hydroxy-sulfobetaine-containing montmorillonite | 10 | $1.68 \times 10^{-2}$ |
| Comparative Example 1 | NAFION | H-montmorillonite | 10 | $2.55 \times 10^{-3}$ |
| Comparative Example 2 | NAFION | Sulfonated montmorillonite | 10 | $5.69 \times 10^{-3}$ |

Example 3

It is exemplified below how to produce a membrane-electrode assembly and a fuel cell.

HiSPEC 1000 (registered trademark) (available from Johnson Matthey) was used as catalyst powder and a NAFION solution was used as an ion-conductive electrolyte solution for a catalyst layer. First, a mixed dispersion of the catalyst powder and the NAFION solution was prepared, and then formed into a membrane on a PTFE sheet by a doctor blade coating method to produce a catalyst layer. Next, using a decalcomania process, the catalyst layer thus produced was transferred onto the ion-conductive polymer composite membrane obtained in Example 1 by hot pressing at 120° C. and 100 kgf/cm² to produce a membrane-electrode assembly. Further, this membrane-electrode assembly was sandwiched between carbon cloth electrodes (available from E-TEK Co., Ltd.), and thereafter, these were held and fastened between collectors to produce a fuel cell.

Hydrogen gas was injected on the anode side of the produced fuel cell at an injection rate of 300 ml/min, and air was supplied on the cathode side thereof, where the cell outlet pressure was set at atmospheric pressure, the relative humidity was set at 50% on both the anode side and the cathode side, and the cell temperature was set at 50° C. Constant current measurement was made at a current density of 400 mA/cm² to find that cell potential was 770 mV, and stable characteristics were maintained even after 100 hours lapsed.

While the present invention has been described with reference to exemplary embodiments, it is to be understood that the invention is not limited to the disclosed exemplary embodiments.

This application claims the benefit of Japanese Patent Application No. 2008-162558 filed on Jun. 20, 2008, which is hereby incorporated by reference in its entirety.

The invention claimed is:

1. A membrane-electrode assembly comprising:
   ion-conductive polymer composite membrane comprising an ion-conductive polymer and ion-conductive materials;
   two catalyst layers provided in contact with the ion-conductive polymer composite membrane,
   wherein the ion-conductive materials each comprise i) an inorganic layered structure comprising a plurality of layers formed of an inorganic compound; and ii) a sulfobetaine-type or hydroxysulfobetaine-type ampholytic surfactant, and wherein the ampholytic surfactant is present between the layers formed of an inorganic compound.

2. The membrane-electrode assembly according to claim 1, wherein the inorganic layered structure is made of a silicate mineral, a phosphate mineral, a titanate mineral, a manganate mineral or a niobate mineral.

3. A fuel cell which comprises the membrane-electrode assembly according to claim 1, two gas diffusion layers provided in contact with the membrane-electrode assembly, and two collectors provided respectively in contact with the two gas diffusion layers.

4. A process for producing an ion-conductive polymer composite membrane, which comprises
   replacing metal ions of a metal ion-containing inorganic layered structures with a sulfobetaine-type or hydroxysulfobetaine-type ampholytic surfactant to form ion-conductive materials, where the metal ion-containing inorganic sheet structures each comprise i) an inorganic layered structure comprising a plurality of layers formed of an inorganic compound and ii) metal ions present between the layers formed of an inorganic compound; and
   dispersing the ion-conductive materials in an ion-conductive polymer membrane.

5. The membrane-electrode assembly according to claim 1, wherein the sulfobetaines-type ampholytic surfactant is selected from the group consisting of alkyl sulfobetaines, alkyl dimethylamino sulfobetaines, fatty acid amide propyl sulfobetaines, and derivatives thereof, and
   wherein the hydroxysulfobetaine-type ampholytic surfactant is selected from the group consisting of alkyl hydroxysulfobetaines, alkyl dimethylamino hydroxysulfobetaines, fatty acid amide propyl hydroxysulfobetaines, and derivatives thereof.

* * * * *